United States Patent [19]
Senjo et al.

[11] Patent Number: 5,831,360
[45] Date of Patent: Nov. 3, 1998

[54] ACTUATOR

[75] Inventors: Motohiro Senjo; Shigeru Sadotomo, both of Shimizu, Japan

[73] Assignee: IAI Corporation, Shizuoka, Japan

[21] Appl. No.: 573,245

[22] Filed: Dec. 15, 1995

[51] Int. Cl.$^6$ ............................. H02K 7/06; H02K 5/16
[52] U.S. Cl. ........................... 310/80; 310/90; 310/42; 74/424.8 R
[58] Field of Search ........................... 310/80, 90, 51, 310/42; 74/424.8 R, 424.8 A, 424.8 B, 424.8 C, 424.8 VA, 424.8 VZ, 424.8 NA

[56] References Cited

U.S. PATENT DOCUMENTS

| | | | |
|---|---|---|---|
| 2,329,151 | 8/1943 | Brady | 310/89 |
| 3,518,471 | 6/1970 | Wightman | 310/90 |
| 3,916,231 | 10/1975 | Cathey | 310/90 |
| 4,492,906 | 1/1985 | Goto et al. | 310/68 B |
| 4,593,217 | 6/1986 | Levine | 310/90 |
| 4,633,664 | 1/1987 | Mueller-Storz et al. | 57/406 |
| 4,796,352 | 1/1989 | Kawada | 310/90 |
| 4,844,625 | 7/1989 | Katsuzawa et al. | 310/90 |
| 4,955,128 | 9/1990 | Sogabe et al. | 310/89 |
| 5,028,073 | 7/1991 | Harms | 310/156 |
| 5,117,138 | 5/1992 | Trian | 310/89 |
| 5,166,565 | 11/1992 | Katsuzawa et al. | 310/90 |
| 5,235,228 | 8/1993 | Nakanura et al. | 310/51 |

FOREIGN PATENT DOCUMENTS

| | | | |
|---|---|---|---|
| 0405002 | 1/1991 | European Pat. Off. | 310/90 |
| 1-86457 | 6/1989 | Japan | H02K 7/06 |
| 1-252339 | 10/1989 | Japan | B23Q 5/42 |
| 6-86501 | 3/1994 | Japan | H02K 7/06 |

*Primary Examiner*—Clayton E. LaBalle
*Assistant Examiner*—Burton S. Mullins
*Attorney, Agent, or Firm*—Sughrue, Mion, Zinn, Macpeak & Seas, PLLC

[57] ABSTRACT

An actuator is designed such that the output shaft of an AC servo motor is rotatably supported on both sides thereof by respective bearing means. This output shaft, the rotor of the AC servo motor, secured to the output shaft, and both bearing means of the AC servo motor can be pulled out together as a unit from inside of the stator of the AC servo motor during disassembly. Another actuator is designed such that the output shaft of an AC servo motor is rotatably supported on both sides thereof by respective bearing means, loads to be respectively applied to the bearing means are transmitted to a housing disposed around the AC servo motor without going through the stator of the AC servo motor, one of the bearing means is fixed in its axial direction and the other bearing means has axial play in its axial direction.

12 Claims, 9 Drawing Sheets

ACTUATOR

BACKGROUND OF THE INVENTION

1. Field of the Invention

The present invention relates to an actuator, and, more particularly, to an actuator which uses a ball-screw integrated type AC servo motor having a ball screw integrated with the output shaft of this AC servo motor and which is designed to have a novel attachment structure to facilitate the assembling and disassembling and to prevent an overload from being applied to the stator, one constituting component, of the AC servo motor.

2. Description of the Related Art

An actuator, for example, a single-axis actuator has a structure as shown in FIG. 9. The actuator has an AC servo motor 101 and a ball screw 107 coupled via a coupling 105 to an output shaft 103 of the AC servo motor 101. Engaged with the ball screw 107 is a ball nut 109 to which a slider 111 is attached. When the AC servo motor 101 rotates in the proper direction, the output shaft 103, the coupling 105 and the ball screw 107 rotate in the same direction. As a result, the ball nut 109, whose rotation is restricted, moves in the proper direction, allowing the slider 111 to move in the same direction.

The AC servo motor 101 comprises a stator 101a and a rotor 101b secured to the output shaft 103. The output shaft 103 is rotatably supported by bearings 113, 115 and 117 on both sides of the AC servo motor 101. The ball screw 107 is rotatably supported by bearings 119, 121 and 123 on both sides of the ball nut 109. Attached to the non-AC servo motor side of the bearing 117 is a detection means (e.g., optical detection means, magnetic detection means or the like) 125 which detects the amount of rotation of the AC servo motor 101.

Some desired device, such as a holding device or a welding manipulator, is to be mounted on the slider 111.

As the output shaft 103 of the AC servo motor 101 and the ball screw 107 are coupled together via the coupling 105 in the thus constituted actuator, the actuator has many components, making its assembling difficult, and tends to become large. The connection by the coupling 105 reduces the rigidity of the assembled parts and may result in the misalignment of the output shaft 103 of the AC servo motor 101 with the core of the ball screw 107. This misalignment may deteriorate the high-precision control.

As a solution to those shortcomings, ball-screw integrated AC servo motors which have a ball screw previously formed integral with the output shaft of the AC servo motor have been proposed as disclosed in, for example, Japanese Unexamined Utility Model Publication No. Hei 1-86457 and Japanese Unexamined Patent Publication Nos. Hei 1-252339 and Hei 6-86501. As those apparatuses integrate the ball screw with the output shaft of the AC servo motor, they can overcome the aforementioned shortcomings which are inherent to the connection of the AC servo motor to the ball screw by a coupling. In addition, they need fewer parts, facilitating the assembling work and resulting in compact apparatuses, and improve the control precision.

One of such apparatuses is exemplified in FIG. 10.

Like or same reference numerals as used in FIG. 9 will be used to denote corresponding or identical components in FIG. 10 with the intention of avoiding repeating their descriptions.

As the ball screw 107 is previously integrated with the output shaft 103 of the AC servo motor 101, unlike the structure shown in FIG. 9, this actuator does not need the coupling 105 and thus can overcome the shortcoming which otherwise arises when the coupling 105 is used.

A more practical structure than the one shown in FIG. 10 is illustrated in FIG. 11. The structure in FIG. 11 differs from that in FIG. 10 in that the output shaft 103 is also rotatably supported on the right-hand side of the AC servo motor 101 in the diagram by a bearing 127, and a bearing pressing member 129 is secured by a bolt 131 on the right-hand side of the bearing 123 in the diagram.

This conventional structure however has the following problem. While the integration of the output shaft of the AC servo motor with the ball screw can attain the aforementioned advantages, such as reducing the number of components to facilitate the assembling work, it raises another problem for the assembling and disassembling work.

According to the conventional structure (the structure shown in FIG. 11 taken as an example), the actuator is assembled through the following procedures (1) to (6).

(1) First, the bearings 121 and 123 are attached to an actuator housing 133, and the bearing pressing member 129 is attached to the housing 133 by the bolt 131. At this time, it should be checked if the pressing amounts of the bearings 121 and 123 are proper and the pressing size of the bearing pressing member 129 should be adjusted by machining or the like whenever necessary.

(2) Next, the output shaft 103 (integrated with the ball screw 107) is inserted.

(3) Then, a sleeve 135 and the rotor 101b are fitted over the output shaft 103 and a nut 138 is fastened. At the time this nut 138 is fastened, it should be checked that the output shaft 103 would not bend and some adjustment should be performed as needed.

(4) Then, the stator 101a is attached.

(5) Next, the bearing 127 located on the non-ball screw side, and a flange 137 are attached.

(6) Finally, detection means 125 is attached.

As is apparent from the above, this conventional structure requires several assembling steps, making the assembling work tiresome. Of those steps, particularly, the check on the pressing amount of the bearing pressing member 129 is considerably troublesome and its workability is very poor because the work is performed within the housing 133. In addition, the bending of the output shaft 103 should be adjusted carefully to avoid the influence of the dead weight of the ball screw 107 that is integrated with the output shaft 103, making the assembling work further troublesome.

The conventional structure also has a problem during maintenance work. For example, the bearings 121 and 123 which are rotatably supporting the output shaft 103 integrated with the ball screw 107 may be damaged by collision or the like while the actuator is in operation. In such a case, the actuator must be disassembled in the reverse procedures from (6) to (1) to remove any damaged bearing. When the replacement is completed, the actuator is assembled in order from step (1) to step (6). This entire process is very tedious.

In some cases, such disassembly and assembly work may not be possible so that the entire actuator must be replaced with a new one even though only some components are defective. The same is true not only of the bearings 121 and 123 but also of the case where the ball screw 107 is damaged, and the case where the rotor 101b of the AC servo motor 101 is damaged. In such a case, the removal of the ball screw 107 or the rotor 101b for repair or replacement is significantly difficult.

There is another problem not involving the assembling and disassembling operation. For a ball-screw integrated type AC servo motor, the output shaft 103 and ball screw 107 are formed with relatively longer spans than the AC servo motor 101. This structure causes various types of deformation on the output shaft and screw shaft, such as the deformation of the screw shaft due to a productional error or an assembling error and the dead-weight originated deformation of the screw shaft. This type of deformation on the fast-rotating shaft causes large "eccentricity" due to the centrifugal force. When the number of rotations of the shaft is in a region close to the resonance frequency of the shaft, in particular, "eccentricity" becomes considerably large. The displacement caused by the load, dimensional or assembling error, or resonance changes the gap between the stator 101a and the rotor 101b, thus impairing the proper performance of the torque generated by the AC servo motor 101.

The detection means 125, attached to the AC servo motor 101, detects the amount of rotation of this motor by detecting a slit formed in a rotatable disk by optical means or the like. When the aforementioned "eccentricity" occurs, however, the positional relationship between the slit and the optical detection means is impaired, disabling the proper detection of the slit.

While it is possible to suppress "eccentricity" by adding another bearing member in the vicinity of the detecting section, some structural consideration should be taken to align the rotor 101b with the stator 101a to generate a uniform torque from the motor. Reactive force acts on the additional bearing member to suppress "eccentricity" so that it is necessary to prevent this reactive force from acting as shearing force on the laminated steel plate of the stator 101a. The mechanism which has the ball screw 107 integrated with the output shaft 103 of the AC servo motor 101 expands due to the heat generated by the operation of the actuator. To ensure the proper detection by the detection means 125, therefore, some consideration should be taken to prevent the expansion-originated displacement from deteriorating the positional relationship with the detection means 125.

Although the aforementioned Japanese Unexamined Utility Model Publication No. Hei 1-86457 and Japanese Unexamined Patent Publication Nos. Hei 1-252339 and Hei 6-86501 disclose a ball-screw integrated type AC servo motor having the structure shown in FIG. 10, none of the publications discuss the above-described problems or how to cope with such problems. No practical ball-screw integrated type AC servo motors have been realized so far.

SUMMARY OF THE INVENTION

Accordingly, it is an object of the present invention to provide an actuator which uses a ball-screw integrated servo motor and is designed to facilitate the task of assembly and disassembly.

It is another object of this invention to provide an actuator capable of suppressing the occurrence of the aforementioned "eccentricity" and overcoming various problems caused by this "eccentricity."

To achieve the above objects, according to one aspect of this invention, there is provided an actuator for causing an AC servo motor having a stator and a rotor to rotate a ball screw previously formed integral with an output shaft of the AC servo motor, thereby moving a slider via a ball nut engaged with the ball screw in such a way that rotation of the ball nut is restricted by the ball screw, which actuator comprises:

bearing means located on both sides of the AC servo motor for rotatably supporting the output shaft of the AC servo motor respectively on both sides thereof, whereby the output shaft of the AC servo motor, the rotor of the AC servo motor, secured to the output shaft, and the bearing means of the AC servo motor can be pulled out together from inside of the stator of the AC servo motor.

This actuator may be designed in such a manner that the bearing means located on a ball screw side of the AC servo motor is held by a bearing-means holding member detachably secured by fixing means to a housing accommodating the AC servo motor, the rotor of the AC servo motor has a diameter smaller than that of an inserting portion of the bearing-means holding member on the ball screw side, and removing the fixing means allows the output shaft, the rotor of the AC servo motor, secured to the output shaft, and the bearing means located on the ball screw side of the AC servo motor to be pulled out together toward the ball screw side from inside of the stator of the AC servo motor.

The bearing means on a non-ball screw side of the AC servo motor may be designed smaller than an inside diameter of the stator of the AC servo motor so that the bearing means is pulled out together with the output shaft.

The bearing means on a non-ball screw side of the AC servo motor may be so designed as to remain in the housing when the output shaft, the rotor of the AC servo motor, secured to the output shaft, and the bearing means located on the ball screw side of the AC servo motor are to be pulled out.

This actuator may be modified in such a manner that the bearing means located on a ball screw side of the AC servo motor is held by a bearing-means holding member provided integrally on a housing accommodating the AC servo motor, a bearing-means pressing member is engaged with the bearing-means holding member, the rotor of the AC servo motor has a diameter smaller than an inside diameter of a main-body holding portion holding the bearing means located on the ball screw side, and loosening and removing the bearing-means pressing member allows the output shaft, the rotor of the AC servo motor, secured to the output shaft, and the bearing means respectively located on both sides of the AC servo motor to be pulled out together from inside of the stator of the AC servo motor.

The bearing-means pressing member may be engaged with the bearing-means holding member by fixing means.

The fixing means may be a fixing screw.

Threads may be formed on the bearing-means pressing member and the bearing-means holding member used as the fixing means.

The bearing-means press member may be pressed fit in the bearing-means holding member.

The bearing means on a non-ball screw side of the AC servo motor may be designed smaller than an inside diameter of the stator of the AC servo motor so that the bearing means can be pulled out together with the output shaft.

The bearing means on a non-ball screw side of the AC servo motor may be so designed as to remain in the housing when the output shaft, the rotor of the AC servo motor, secured to the output shaft, and the bearing means located on the ball screw side of the AC servo motor are pulled out.

The actuator of this invention is designed in such a way that the output shaft of the AC servo motor is rotatably supported at both sides thereof by the associated bearing means and the output shaft, the rotor of the AC servo motor, secured to the output shaft, and the bearing means of the AC servo motor can be pulled out together from inside of the stator of the AC servo motor, thus facilitating the assembly and disassembly of the actuator.

According to another aspect of this invention, there is provided an actuator for causing an AC servo motor having a stator and a rotor to rotate a ball screw previously formed integral with an output shaft of the AC servo motor, thereby moving a slider via a ball nut engaged with the ball screw in such a way that rotation of the ball nut is restricted by the ball screw, which actuator comprises:

bearing means located on both sides of the AC servo motor for rotatably supporting the output shaft of the AC servo motor respectively on both sides thereof, whereby loads to be respectively applied to the bearing means are transmitted to a housing disposed around the AC servo motor without going through the stator of the AC servo motor, one of the bearing means is fixed in an axial direction and the other bearing means is set free in an axial direction.

With this structure, the output shaft may be provided in such a way as to penetrate the AC servo motor and protrude on a side opposite of the ball screw, and detection means for detecting an amount of rotation of the AC servo motor may be provided where the protruding part is provided, with one of the bearing means being provided between the detection means and the AC servo motor.

The output shaft may be provided in such a way as to penetrate the AC servo motor and protrude on a side opposite the ball screw, and detection means for detecting an amount of rotation of the AC servo motor may be provided where the protruding part is provided, with one of the bearing means being provided on a non-AC servo motor side of the detection means.

The bearing means located on a ball-screw side of the AC servo motor may be fixed in the axial direction, and the bearing means located on a detection means side may also be set free in the axial direction.

The bearing means located on a detection means side of the AC servo motor may be fixed in the axial direction, and the bearing means located on a ball-screw side may be set free in the axial direction.

The bearing means set free in the axial direction may be movable in the axial direction within an elastically deformable range of a press-fit elastic member.

The stator of the AC servo motor may be securely attached to the housing by means of a screw.

The stator may be securely attached to a mounting seat provided on the housing by means of a screw, with a clearance formed between an outer periphery of the stator and the housing.

In the actuator using a ball-screw integrated type AC servo motor, the output shaft of the AC servo motor is rotatably supported by the bearing means on both sides of the AC servo motor, and a load does not act directly on the stator of the AC servo motor but is transmitted to the housing disposed at the outer periphery of the AC servo motor. Accordingly, the "eccentricity" of the stator and rotor of the AC servo motor and the detection means can be prevented and the proper performance of the AC servo motor and the detection means can be ensured. As the rotatable support of the output shaft of the AC servo motor on both sides thereof is independent from the stator in this structure, there is no deterioration of the coaxiality caused by the accumulated errors in fitting the output shaft into the stator. This structure prevents the shearing force from acting on the stator and thus maintains the proper performance.

Further, one of two bearing means is fixed in the axial direction to prevent the displacement of the ball screw, which is easy to thermally expand due to its length, from reaching the detection side, while the other bearing means is set free in the axial direction to be able to absorb various displacements and an assembling error.

In the aforementioned case where the output shaft is provided in such a way as to penetrate the AC servo motor and protrude on the opposite side of the ball screw, the detection means for detecting the amount of rotation of the AC servo motor is provided where one of the bearing means is provided between the detection means and the AC servo motor, the output shaft is supported immediately before the detection means so that the influence of the eccentricity on the detection means can be reduced significantly.

In another case mentioned above where the output shaft is provided in such a way as to penetrate the AC servo motor and protrude on the opposite side of the ball screw, the detection means for detecting an amount of rotation of the AC servo motor may be provided between the bearing means and the AC servo motor on the non-ball screw side of the motor, providing firmer support to further suppress the influence of the eccentricity on the detection means.

In the aforementioned case where the stator of the AC servo motor is securely attached to the housing by means of a screw, the attachment structure for the stator becomes more rigid, thereby considerably reducing the influence of the load.

In the aforementioned case where the stator of the AC servo motor is securely attached to the mounting seat provided on the housing by means of a screw with a clearance formed between the outer periphery of the stator and the housing, even if a load is transmitted to the housing, its influence on the stator is suppressed greatly by this clearance.

DETAILED DESCRIPTION OF THE PREFERRED EMBODIMENTS

First Embodiment

Figure 1:
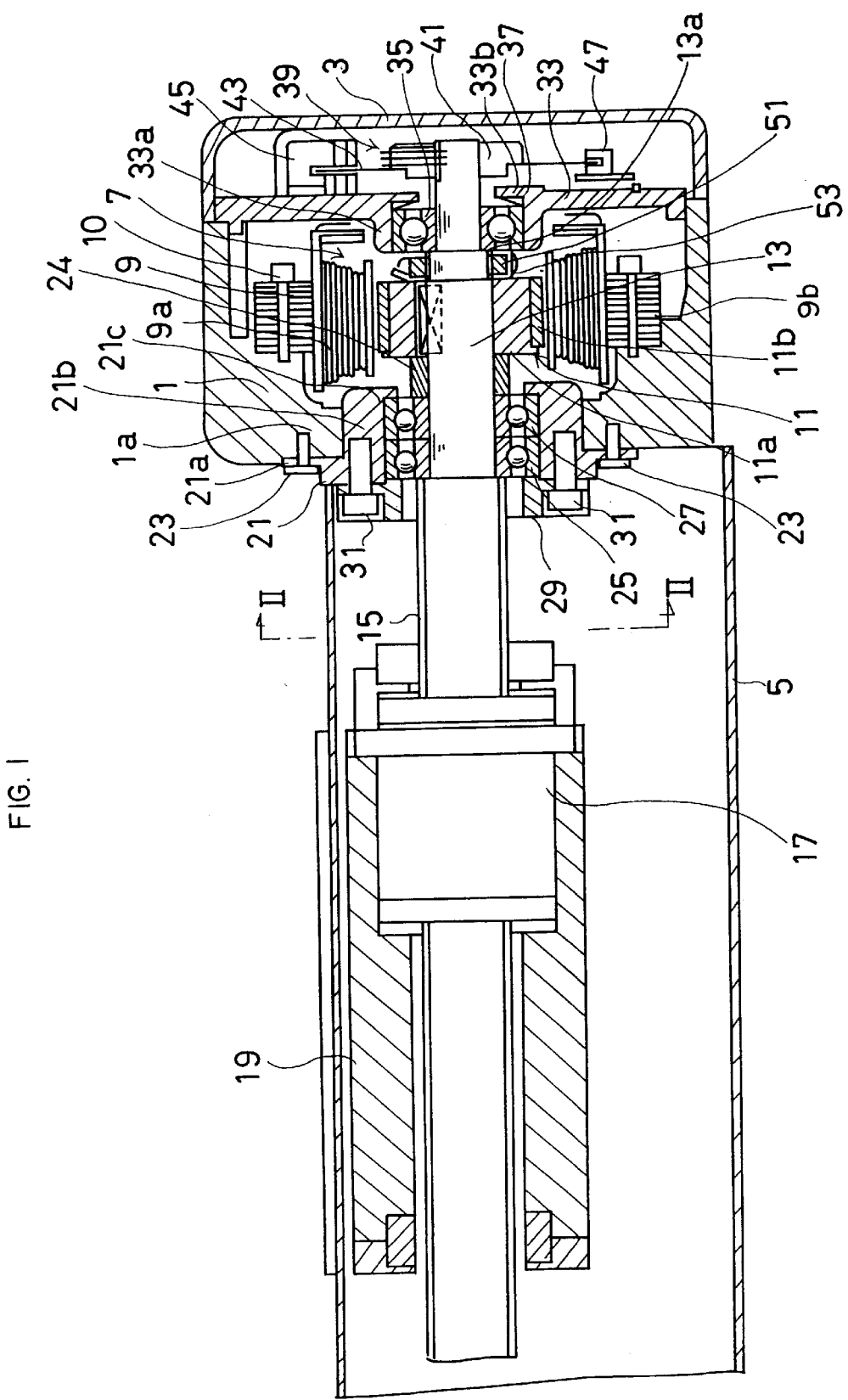
FIG. 1 is a cross-sectional view showing the structure of a part of an actuator according to a first embodiment of the present invention.

The first embodiment of the present invention will now be described with reference to FIGS. 1 and 2, which show a part of an actuator (the structure on the AC servo motor side) according to this embodiment. This actuator has a housing 1 for an AC servo motor 7, and a cap attached to the right end of this housing 1 in FIG. 1. Another housing 5 for accommodating the moving mechanism of the actuator is attached to the left side in FIG. 1. The AC servo motor 7, retained in the housing 1, comprises a stator 9 attached to the housing 1 and a rotor 11 rotatably arranged on the inner surface side of the stator 9. The stator 9 has a stator body 9a made of a laminated steel plate, and a coil 9b. The stator 9 is secured to the housing 1 by a bolt 10 in a direction parallel to a screw shaft. The rotor 11 includes a rotor body 11a and a magnet 11b securely attached to the outer surface of the rotor body 11a.

The output shaft, 13, of the AC servo motor 7 is disposed on the inner surface side of the rotor 11, and is secured to the rotor 11 by a key-and-key-groove structure. The output shaft 13 is a ball-screw integrated type and has a ball screw 15 provided in a predetermined range on the left side in FIG. 1. A ball nut 17 is engaged with this ball screw 15, and a slider 19 is fixed to the ball nut 17. As the AC servo motor 7 is rotated in the proper direction, therefore, the ball screw 15 rotates in the same direction so that the ball nut 17 whose rotation is restricted and the slider 19 secured to the ball nut 17 move in the proper direction (rightward or leftward in FIG. 1).

The support structure for the ball-screw integrated type output shaft 13 will now be described. A flange portion 1a is provided on the left end of the housing 1 in the diagram, and a bearing holder 21 is located on the inner surface side of the flange portion 1a. This bearing holder 21 has a flange portion 21a and a cylinder portion 21b, with an engage portion 21c protruding from the inner surface of the cylinder portion 21b at the right end in the diagram. The bearing holder 21 is secured to the flange portion 1a of the housing 1 by a plurality of securing bolts 23 (four bolts in this embodiment) via the flange portion 21a.

Bearings 25 and 27, which constitute one bearing means, are placed on the inner surface side of the cylinder portion 21b of the bearing holder 21 to rotatably support the output shaft 13. A bearing pressing member 29 is secured to the left side (in the diagram) of the bearing holder 21 by a plurality of securing bolts 31 (four bolts in this embodiment) to secure the bearings 25 and 27 in the space defined by this bearing pressing member 29 and the engage portion 21c. That is, the outer rings of the two bearings 25 and 27 are attached with their axial movements restricted. The inner rings of the bearings 25 and 27 are secured to the shoulder portion of the ball screw 15 provided on the output shaft 13 by a nut 51, which is engaged with the output shaft 13 via a sleeve 24, the rotor 11 and a washer 53, so that the axial movement of the output shaft 13 is restricted.

Figure 2:
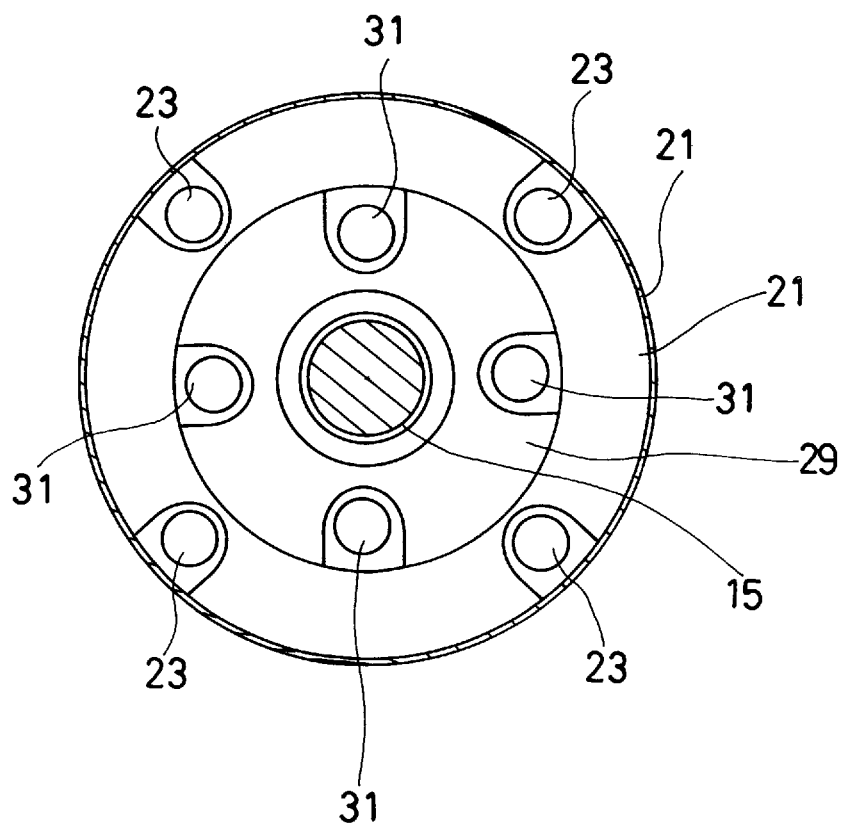
FIG. 2 is a cross-sectional view along the line II—II in FIG. 1, showing the first embodiment.

A flange member 33 separate from the housing 1 is placed on the right side of the AC servo motor 7 in FIG. 1. This flange member 33 has a cylinder portion 33a and an engage portion 33b protruding from this cylinder portion 33a at the right end in the diagram. A bearing 35 serving as another bearing means is placed at the cylinder portion 33a to rotatably support the output shaft 13. A leaf spring 37 as an elastic member is intervened between the bearing 35 and the engage portion 33b to normally urge the bearing 35 leftward in the diagram. In other words, the bearing 35 is held by the step portion, 13a, of the output shaft 13 and the leaf spring 37 in such a way as to be movable in the axial direction within the elastically deformable range of the leaf spring 37.

The distal end of the output shaft 13 extends rightward of the bearing 35 in FIG. 1 and detection means 39 is provided there. A disk-attaching nut 41 is engaged with the distal end of the output shaft 13, and a disk 43 having a slit is attached to this nut 41. Sensors 45 and 47 are disposed at the outer periphery of the disk 43 to optically detect the slit of the disk 43 to thereby detect the amount of rotation of the output shaft 13 or the AC servo motor 7.

The end portion of the output shaft 13 on the ball screw side is rotatably supported by a bearing (not shown). That is, the ball-screw integrated type output shaft 13 is rotatably supported at three parts in this embodiment.

The action of the actuator with the above-described structure will now be explained. To begin with, the disassembly and assembly works of the actuator will be discussed. First, the cap 3 is removed from the housing 1 to expose the detection means 39. Next, the sensors 45 and 47 are removed and the nut 41 is removed from the output shaft 13 in this situation. Consequently, the disk 43 is removed thereby accomplishing the removal of the entire detection means 39.

Then, the four securing bolts 23 that secure the bearing holder 21 to the housing 1 are removed. As the left side of the actuator in FIG. 1 is pulled out in that situation, the output shaft 13, the bearings 25 and 27, the bearing pressing member 29, the bearing holder 21, the rotor 11, the washer 53, the nut 51 and the bearing 35 are all pulled out together from inside of the stator of the AC servo motor 7. In other words, the above-described disassembly work alone permits the interior of the AC servo motor 7 to be easily separated into a stator side and a rotor side, thereby exposing the interior. Thereafter, the necessary components can be removed, as needed, for repair or replacement. This facilitates repair or replacing work.

The outside diameter of the bearing 35 is set smaller than that of the rotor 11 and the outside diameter of the rotor 11 is set smaller than that of the cylinder portion 21b of the bearing holder 21 to permit the aforementioned pull-out operation.

In assembling the actuator, the integral unit having the output shaft 13, the bearings 25 and 27, the bearing pressing member 29, the bearing holder 21, the rotor 11, the washer 53, the nut 51 and the bearing 35 is inserted inside the stator 9 of the AC servo motor 7. After the insertion, the four bolts 23 for securing the bearing holder 21 are fastened to securely attach the output shaft 13, the bearings 25 and 27, the bearing pressing member 29, the bearing holder 21, the rotor 11, the washer 53, the nut 51 and the bearing 35 to the stator side of the AC servo motor 7. Then, the detection means 39, i.e., the nut 41 and the sensors 45 and 47, is attached, followed by the attachment of the cap 3 to the housing 1, which completes the assembly work.

It is apparent from the above that the actuator can be disassembled and assembled very simply. With the detection means 39 removed, simply removing the four bolts 23 that secure the bearing holder 21 to the housing 1 allow the output shaft side which is integrally provided with the rotor 11 of the AC servo motor 7, to be easily pulled out. The repair or replacement of arbitrary components, e.g., the bearings 25, 27 and 35 and the rotor 11, can be accomplished very simply.

Further, this embodiment has an advantage such that the disassembly and assembly work can be carried out without separating the housing 1 where the bearing-means holding member is inserted, and the flange member 33 where the bearing 35 is inserted, from each other or changing their positional relationship. This means that the output shaft 13 can be accurately aligned with the actuator body during assembly after repair or replacement and that no troublesome adjustments or checking are needed at all for that alignment. This feature is significantly advantageous in suppressing the improper function of the actuator and the shortening of the service life thereof originating from the misalignment of the actuator body with the core of the ball screw 15, or in preventing the rotational torque from becoming uneven due to the improper gap between the stator 9 and the rotor 11 of the AC servo motor 7.

This embodiment has another advantage that the amount of pressure of the bearing pressing member 29 can be adjusted without installing the bearings 25 and 27 in the housing 1. This advantage facilitates the measurement and adjustment of the amount of pressure and allows the axial eccentricity mainly of the output shaft 13 to be checked and adjusted in an independent step before assembling the output shaft 10 into the housing 1.

A description will now be given of the operation and advantages of improving the rigidity of the support section for the output shaft 13 to suppress the "eccentricity" of the core of the output shaft 13. The output shaft 13 is rotatably supported in the lengthwise direction at three portions: by an unillustrated bearing located at the left end in FIG. 1, by the bearings 25 and 27 at the left end in the housing 1 and by the bearing 35 on the right side of the AC servo motor 7 in the diagram. The supporting of the output shaft 13 at those three portions can improve the rigidity of the support section for the output shaft 13 and thus suppress the "eccentricity" of the core. As the output shaft 13 is supported by the bearing 35 on the right side of the AC servo motor 7 in the diagram, in particular, the "eccentricity" of the output shaft 13 on the detection means side can be suppressed effectively. Consequently, the relative positional relationship of the disk 43 and the sensors 45 and 47 of the detection means 39 does not change, thus always ensuring high-precision detection.

A load which acts on the AC servo motor 7, particularly, its constituting stator 9, will be explained below. With the normal structure for rotatably supporting the output shaft 13 via the stator 9 of the AC servo motor 7, for example, the support of the output shaft 13 causes a shearing force to act on the output shaft 13. This shearing force directly acts on the stator 9 of the AC servo motor 7. According to this embodiment, however, even when some load acts on the output shaft 13, the load is transmitted to the housing 1 via the bearings 25 and 27 and is transmitted to the flange member 33 and the housing 1 via the bearing 35. This will be discussed more specifically. At the locations of the bearings 25 and 27, the load is transmitted from there to the housing 1 via the bearing holder 21 and does not act directly on the stator 9. At the location of the bearing 35, the load is transmitted to the housing 1 via the flange member 33 and likewise does not act directly on the stator 9. In other words, even when some load acts on the output shaft 13, it does not act directly on the stator 9, so that the stator 9 will not shift to change its relative position to the rotor 11. Accordingly, the proper performance of the AC servo motor 7 will not be impaired.

In the transmission path through the bearing 35 and the flange member 33, particularly, because of the clearance provided between the stator 9 and the housing 1 as shown in FIG. 1, even when some load acts on the output shaft 13, it does not act directly on the stator 9, and if the load is transmitted to the housing, it is very unlikely that the load will act on the stator 9.

The advantage associated with the freedom of the bearing 35 in the axial direction will now be discussed. As described earlier, the bearing 35 is attached in such a way as to be movable in the axial direction within the elastically deformable range of the leaf spring 37. Even if the output shaft 13 shifts in the core direction for some reason, this shift can effectively be absorbed. Further, even the shifting of the attaching positions of the individual components in the core direction due to the dimensional errors or the like of the components can also be absorbed.

As the output shaft 13 is supported at the three portions, the supporting mechanism for the output shaft 13 becomes firmer, thus permitting the number of rotations to be increased. This means that the operational speed of the actuator can be increased.

Second Embodiment

Figure 3:
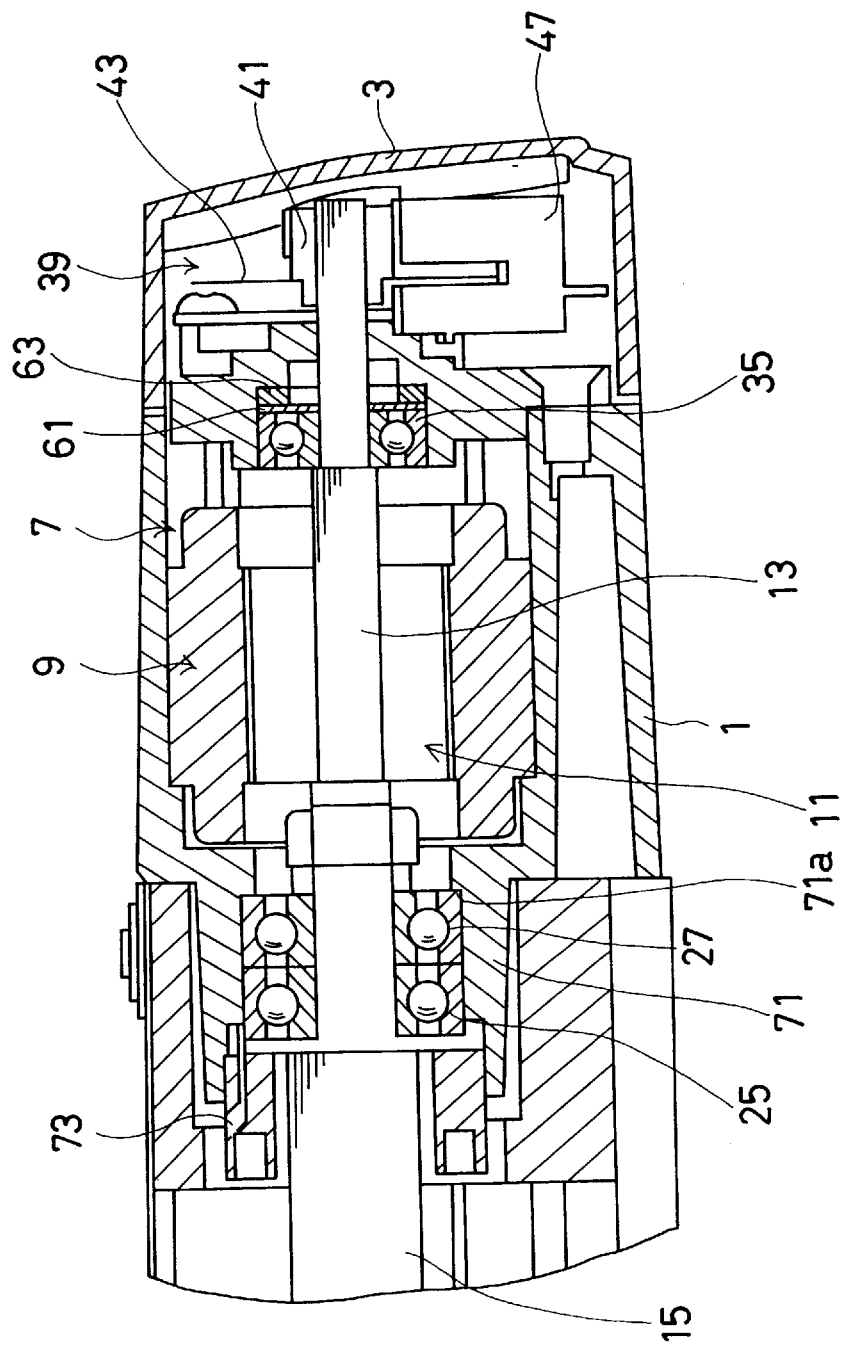
FIG. 3 is a cross-sectional view showing the structure of a part of an actuator according to a second embodiment of this invention.
Figure 4:
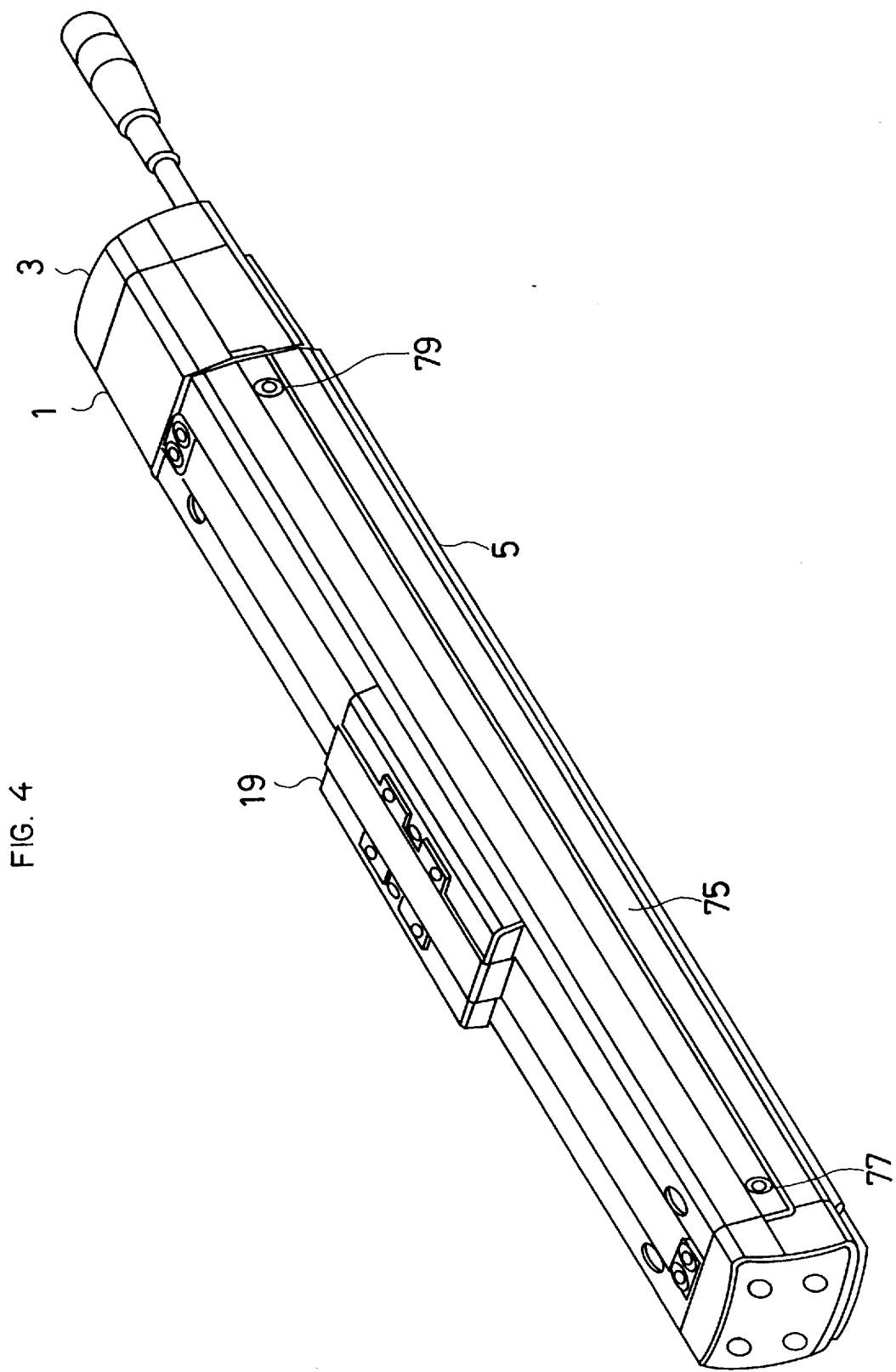
FIG. 4 is a cross-sectional view showing the outline of the actuator according to the second embodiment.

The second embodiment of this invention will now be described with reference to FIGS. 3 and 4. Like or same reference numerals as used for the first embodiment will also be used for the second embodiment with the intention of avoiding their redundant descriptions.

In this embodiment, a bearing holder 71 for holding the bearings 25 and 27 is previously formed integral with the housing 1. This bearing holder 71 has a step portion 71a. A bearing pressing member 73 is engaged with the bearing holder 71 from the left side in FIG. 3. The leaf spring 37 in the first embodiment is replaced with a shim ring 61 and a wave washer 63. As shown in FIG. 4, a side cover plate 75 is detachably attached to one side of the actuator by left and right securing screws 77 and 79. When the side cover plate 75 is detached by removing the screws 77 and 79, the interior of the actuator can be exposed as shown in FIG. 3 and the bearing pressing member 73 can be tightened or loosened by an inserted tool (not shown).

The function of this structure will now be described. When assembled, the actuator becomes as shown in FIG. 4 and its interior, particularly, the interior of the AC servo motor 7 becomes as shown in FIG. 3. To disassemble the actuator in this situation, first, the side cover plate 75 shown in FIG. 4 is detached by removing the two screws 77 and 79, thus exposing the internal structure shown in FIG. 3.

Next, the cap 3 is removed from the housing 1 to expose the detection means 39. Then, the detection means 39 is removed. More specifically, the sensor 47 is removed and the nut 41 is removed from the output shaft 13, thus removing the disk 43, whereby the entire detection means 39 is detached.

Then, the engagement of the bearing pressing member 73 with the bearing holder 71 is loosened by an inserted tool (not shown). Thereafter, the output shaft 13 should simply be pulled out from the AC servo motor 7. As a result, the output shaft 13, the rotor 11, the bearings 25 and 27, the bearing pressing member 73, and the bearing 35 are pulled out together from inside of the stator of the AC servo motor 7. Any necessary components can then be serviced, inspected or replaced.

The assembling of the disassembled actuator will now be discussed. In this case, the output shaft 13, the rotor 11, the bearings 25 and 27, the bearing pressing member 73, and the bearing holder 35 are inserted inside the stator side of the AC servo motor 7. After the insertion, the bearing pressing member 73 is driven into the bearing holder 71 by using an unillustrated tool. Consequently, the output shaft 13, the rotor 11, the bearings 25 and 27, the bearing pressing member 73 and the bearing 35 are securely attached to the stator side of the AC servo motor 7. Then, the detection means 39 is attached to the distal end of the output shaft 13, followed by the attachment of the cap 3 to the housing 1 and the side cover plate 71 to the side of the actuator. This completes the assembling work.

The second embodiment therefore has the same advantages as the first embodiment.

The outside diameter of the bearing 35 is set smaller than that of the rotor 11 and the outside diameter of the rotor 11 is set smaller than that of the step portion 71a of the bearing holder 71 to permit the aforementioned pull-out operation.

Third Embodiment

Figure 5:
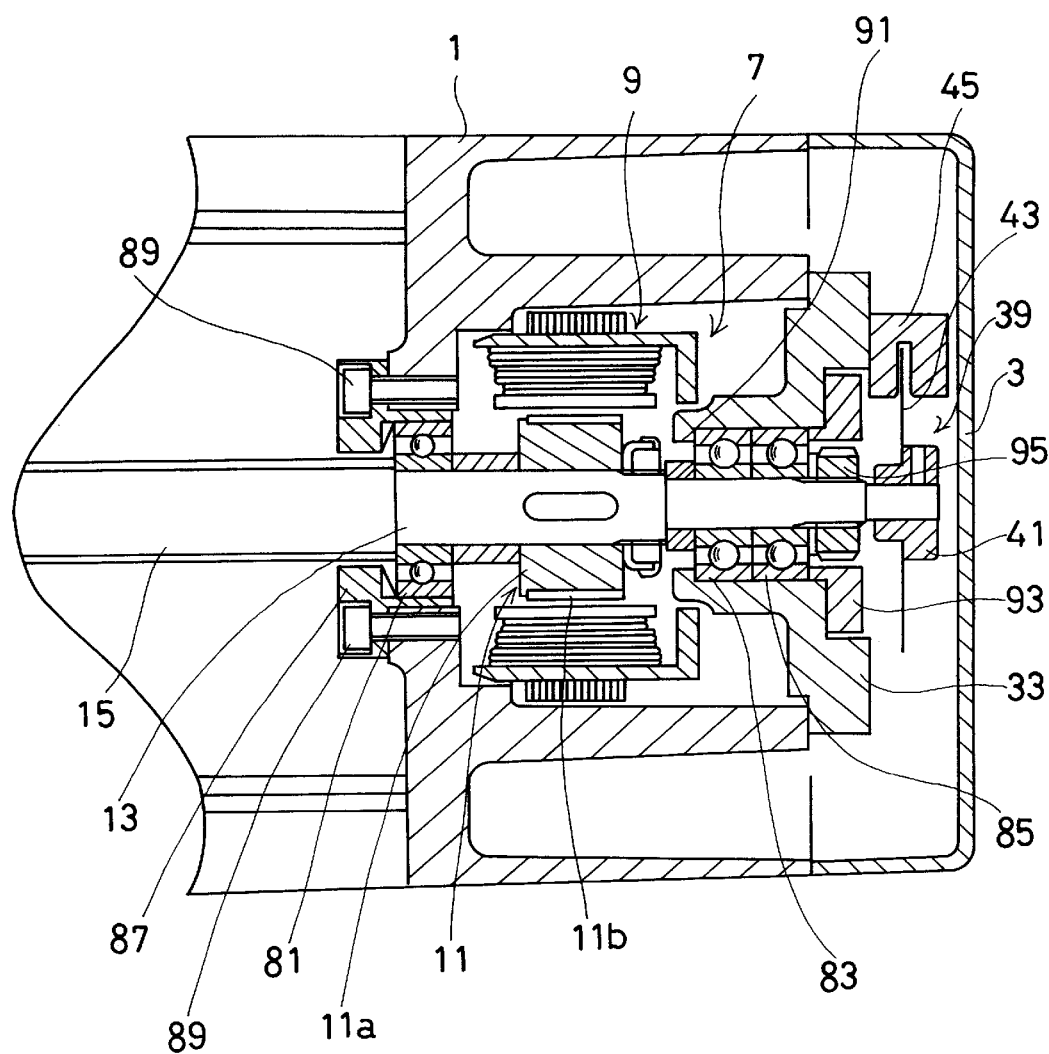
FIG. 5 is a cross-sectional view showing the structure of a part of an actuator according to a third embodiment of this invention.

The third embodiment of this invention will now be described with reference to FIG. 5. This embodiment is designed so that the bearings located on the non-ball screw (15) side of the AC servo motor 7 stay unremoved at the time of pulling out the output shaft 13, etc. The output shaft 13 is rotatably supported by a bearing 81 on the left side of the AC servo motor 7 in the diagram and by bearings 83 and 85 on the right side of the AC servo motor 7 in the diagram. The bearing 81 is pressed by a bearing pressing member 87 which is securely attached by a securing bolt 89. The bearings 83 and 85 are held between a step portion 91 formed at the flange member 33 and a bearing pressing member 93. A fastening nut 95 is fastened to secure the bearings 83 and 85.

To pull out the output shaft 13, etc. from the above-described structure, the bolt 89 securing the bearing pressing member 87 is removed as per the first and second embodiments. Next, the cap 3 is removed from the housing 1 to expose the detection means 39. Then, the detection means 39 is removed. More specifically, the sensor 45 is removed and the nut 41 is removed from the output shaft 13, thus allowing removal of the disk 43, thereby detaching the entire detection means 39. Then, the nut 95 is removed. Under this situation, the output shaft 13, integrated with the ball screw 15 is pulled toward the ball screw side. In this case, the bearings 83 and 85 remain unremoved. That is, because the bearings 83 and 85 are held by the step portion 91 and the bearing pressing member 93, those bearings 83 and 85 remain even when pulling out the output shaft 13, etc. is performed.

Fourth Embodiment

Figure 6:
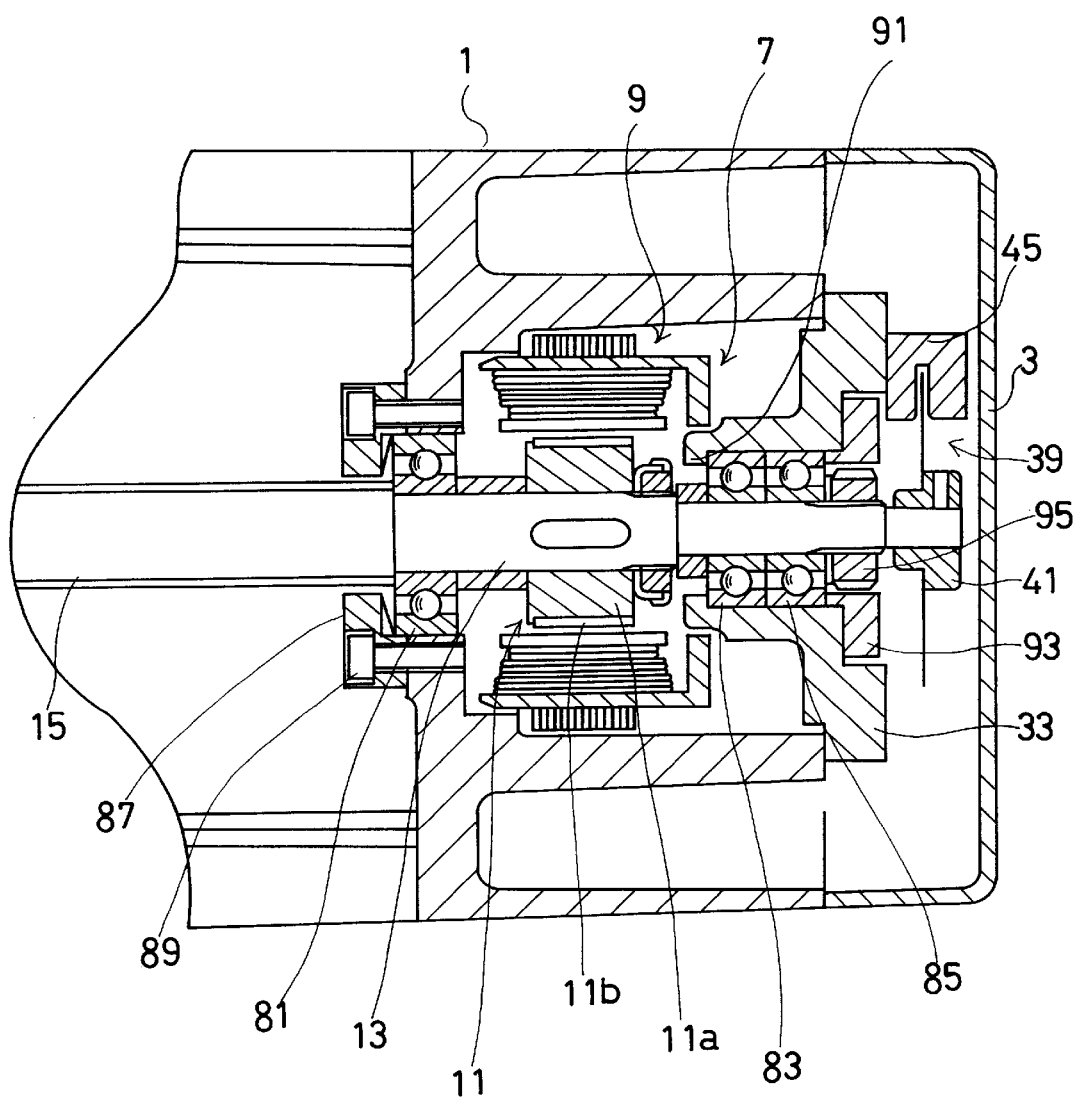
FIG. 6 is a cross-sectional view showing the structure of a part of an actuator according to a fourth embodiment of this invention.

The fourth embodiment of this invention will now be described with reference to FIG. 6. This embodiment like the third embodiment is designed so that the bearings located on the non-ball screw (15) side of the AC servo motor 7 remain at the time of pulling out the output shaft 13, etc. This embodiment differs from the third embodiment in the bearing pressing member 87 which is pressing the bearing 81. The bearing pressing member 87 in the third embodiment has a shape to hold the bearing 81, whereas in the fourth embodiment, the bearing 81 is held by the housing 1 and the bearing pressing member 87 simply presses this housing 1. The other structure is the same as that of the third embodiment, and the bearings 83 and 85 remain in place at the time of pulling out the output shaft 13, etc. as per the third embodiment.

Fifth Embodiment

The fifth embodiment of this invention will now be described with reference to FIG. 7. In this embodiment, the bearing 35 is located on the right side of the detection means 39 in the diagram, thereby further suppressing the influence of the "eccentricity" of the output shaft 13 on the detection means 39.

Figure 7:
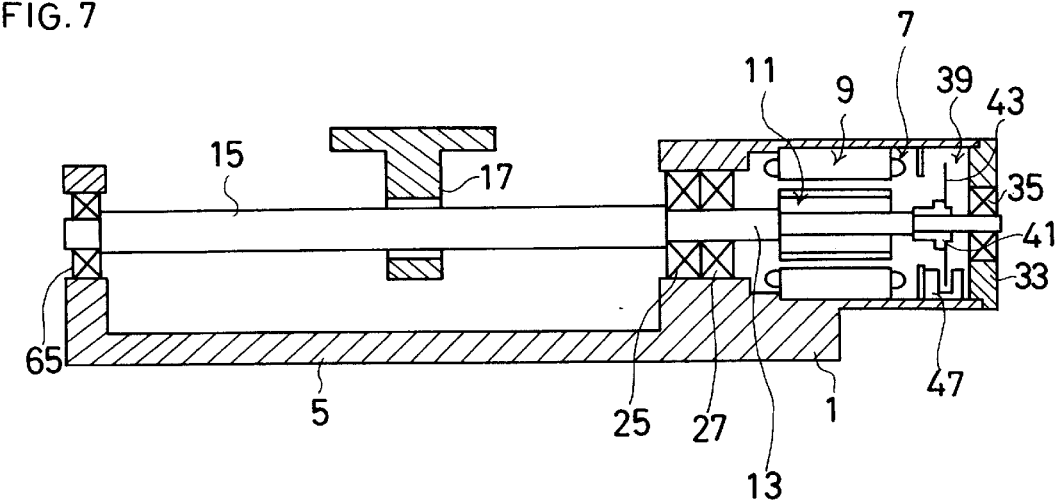
FIG. 7 is a cross-sectional view showing the structure of a part of an actuator according to a fifth embodiment of this invention.

FIG. 7 shows a bearing 65 for rotatably supporting the end portion of the output shaft 13 on the ball screw side.

Sixth Embodiment

Figure 8:
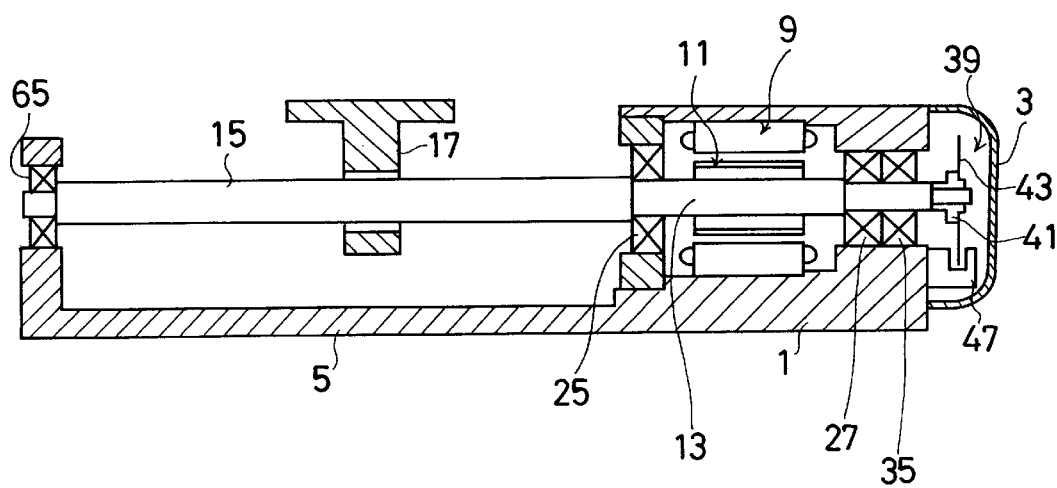
FIG. 8 is a cross-sectional view showing the structure of a part of an actuator according to a sixth embodiment of this invention.
Figure 9:
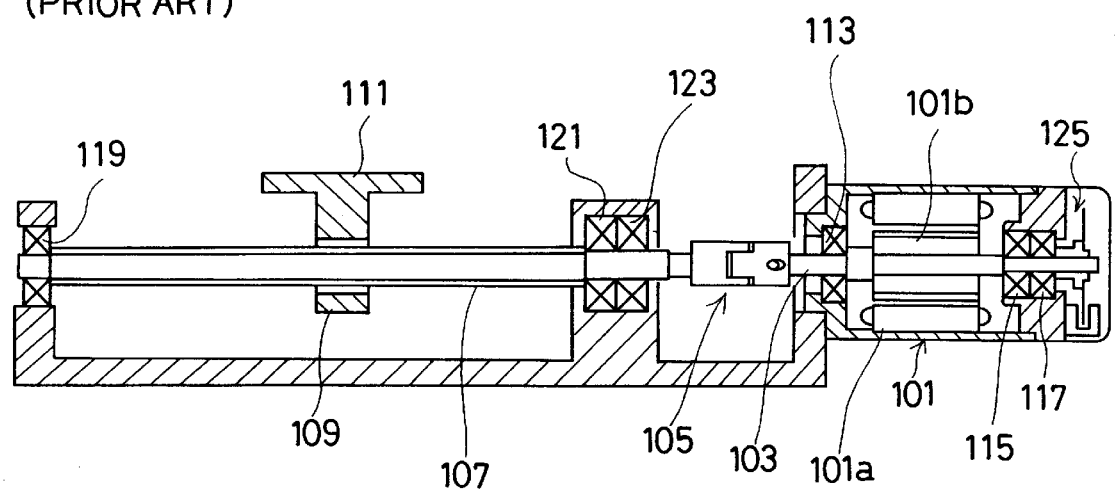
FIG. 9 is a cross-sectional view showing the structure of an actuator according to one prior art.
Figure 10:
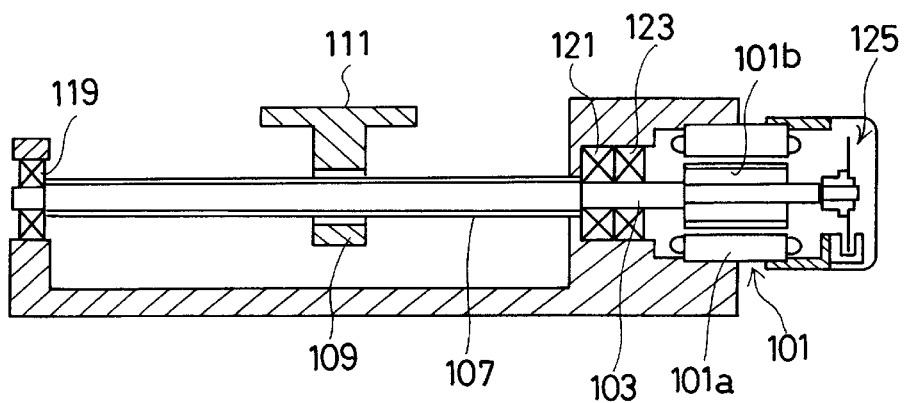
FIG. 10 is a cross-sectional view showing the structure of an actuator according to another prior art.
Figure 11:
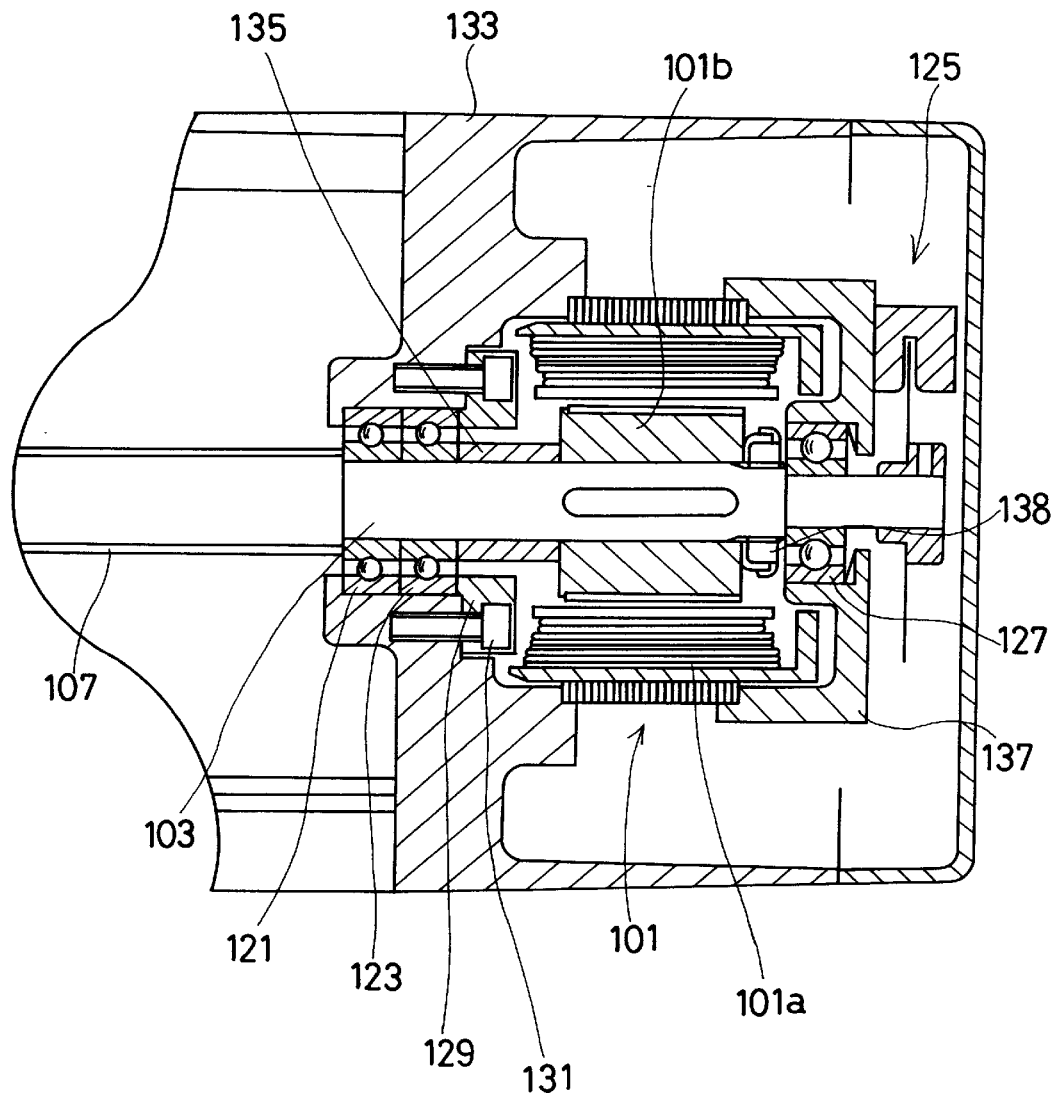
FIG. 11 is a cross-sectional view showing the structure of an actuator according to further prior art.

The sixth embodiment of this invention will now be described with reference to FIG. 8. This embodiment has one bearing (bearing 25) on the left side of the AC servo motor 7 in the diagram and two bearings (bearings 27 and 35) on the right side of the AC servo motor 7 in the diagram.

This invention is not limited to the above-described embodiments but may be embodied in various other forms within the scope and spirit of the invention. The fundamental structure of the actuator is not limited to those illustrated. The number of bearings used for each bearing means may be arbitrarily set.

Various structures may be employed for the structure which allows the output shaft, the rotor of the AC servo motor, secured to the output shaft, and the bearing means located on both sides of the AC servo motor to be pulled out together from inside of the stator of the AC servo motor.

What is claimed is:

1. An actuator comprising:

an AC servo motor comprising a stator and a rotor;

an output shaft secured to said rotor of said AC servo motor;

a ball screw formed integrally with said output shaft;

a bearing arrangement comprising a first bearing means located on a first side of said AC servo motor and a second bearing means located on a second side of said AC servo motor, said first and second bearing means being provided for rotatably supporting said output shaft of said AC servo motor respectively on both sides thereof;

means for interconnecting said rotor, said output shaft and at least said first bearing means in such a manner as to be removable from inside said stator as a unit; and a housing for said AC servo motor, wherein said first bearing means is located on a ball screw side of said AC servo motor and is held by a bearing-means holding member provided detachably on said housing accommodating said AC servo motor, wherein a bearing means pressing member is detachably engaged with said bearing-means holding member, wherein said bearing-means holding member, said bearing means pressing member and said first bearing means are removable as a unit by removing said bearing-means holding member from said housing in a state that said first bearing means is supported both by said bearing-means holding member and by said bearing means pressing member, wherein said rotor has a diameter smaller than an inside diameter of said bearing-means holding member holding said first bearing means, and wherein said output shaft, said rotor, secured to said output shaft, and said first and second bearing means, respectively located on both sides of said AC servo motor are removable as a unit from within said stator of said AC servo motor by removing said bearing-means holding member from said housing.

2. An actuator claimed in claim 1, wherein said bearing-means pressing member is engaged with said bearing-means holding member by fixing means.

3. An actuator claimed in claim 2, wherein said fixing means is a fixing screw.

4. An actuator claimed in claim 2, wherein threads are formed on said bearing-means pressing member and said bearing-means holding member as said fixing means.

5. An actuator claimed in claim 1, wherein said bearing-means pressing member is pressed fit in said bearing-means holding member.

6. An actuator claimed in claim 1, wherein said second bearing means is located on a non-ball screw side of said AC servo motors, wherein a diameter of said second bearing means is smaller than an inside diameter of said stator 4, and wherein said second bearing means is affixed to said output shaft and is removable from within said stator as a unit with said output shaft.

7. An actuator as claimed in claim 1, further comprising:

detection means for detecting an amount of rotation of said AC servo motor; wherein:

one of said bearing means is fixed in an axial direction and another of said bearing means is movable in the axial direction; and said bearing means that is movable in the axial direction is movable in the axial direction within a range defined by an elastic structure provided in said bearing pressing member and contacting said movable bearing means.

8. An actuator claimed in claim 7, wherein:

said first bearing means is located on a ball-screw side of said AC servo motor and is fixed in the axial direction, and said second bearing means provided on the non-AC-servo-motor side of said detection means is movable in the axial direction.

9. An actuator claimed in claim 7, wherein:

said second bearing means provided on the non-AC-servo-motor side of said detection means is fixed in the axial direction, and said first bearing means is located on a ball-screw side of said AC servo motor and is movable in the axial direction.

10. An actuator claimed in claim 7, wherein said stator of said AC servo motor is securely attached to said housing by means of a screw.

11. An actuator claimed in claim 10, further comprising:

a mounting seat provided on said housing, wherein said stator is securely attached to said mounting seat by means of a screw, with a clearance formed between an outer periphery of said stator and said housing.

12. An actuator as claimed in claim 1, further comprising:

a ball nut engaged with said ball screw such that rotation of said ball nut is restricted by said ball screw; and a slider mounted to said ball nut and movable along said ball screw via said ball nut.

* * * * *